United States Patent
Kondo et al.

(10) Patent No.: US 8,668,060 B2
(45) Date of Patent: Mar. 11, 2014

(54) ELECTROMAGNETIC SHOCK ABSORBER FOR VEHICLE

(75) Inventors: Satoshi Kondo, Okazaki (JP); Takuhiro Kondo, Kani (JP); Yoshifumi Shige, Kashiba (JP); Katsura Koyagi, Kashihara (JP); Hajime Watanabe, Kashihara (JP)

(73) Assignees: Toyota Jidosha Kabushiki Kaisha, Toyota-shi (JP); Kayaba Industry Co., Ltd., Tokyo (JP); JTEKT Corporation, Osaka-shi (JP)

( * ) Notice: Subject to any disclaimer, the term of this patent is extended or adjusted under 35 U.S.C. 154(b) by 261 days.

(21) Appl. No.: 12/679,768

(22) PCT Filed: Oct. 10, 2008

(86) PCT No.: PCT/JP2008/068918
§ 371 (c)(1),
(2), (4) Date: Mar. 24, 2010

(87) PCT Pub. No.: WO2009/054331
PCT Pub. Date: Apr. 30, 2009

(65) Prior Publication Data
US 2010/0200343 A1    Aug. 12, 2010

(30) Foreign Application Priority Data

Oct. 25, 2007   (JP) .................. 2007-277200

(51) Int. Cl.
*F16F 15/03*   (2006.01)
(52) U.S. Cl.
USPC ...................................... 188/267
(58) Field of Classification Search
USPC .............. 188/267, 297; 74/89.23, 89.3, 89.37
See application file for complete search history.

(56) References Cited

U.S. PATENT DOCUMENTS

| 4,939,946 | A | * | 7/1990 | Teramachi | 74/89.3 |
| 5,094,118 | A | * | 3/1992 | Morita | 74/89.31 |
| 8,127,900 | B2 | * | 3/2012 | Inoue | 188/267 |
| 2005/0255927 | A1 | | 11/2005 | Michioka et al. | |
| 2008/0164111 | A1 | | 7/2008 | Inoue et al. | |
| 2009/0120745 | A1 | * | 5/2009 | Kondo et al. | 188/267 |

FOREIGN PATENT DOCUMENTS

| EP | 1 829 718 | 9/2007 |
| JP | 6 346941 | 12/1994 |

(Continued)

OTHER PUBLICATIONS

Machine translation of JP11-141644A.*

*Primary Examiner* — Anna Momper
(74) *Attorney, Agent, or Firm* — Oblon, Spivak, McClelland, Maier & Neustadt, L.L.P.

(57) ABSTRACT

An electromagnetic absorber (10) for a vehicle including (a) a threaded rod (78) which is disposed on one of a sprung portion and an unsprung portion and which has a threaded groove (76) formed in its outer circumferential portion and an axial groove (90) extending in its axis direction (b) a nut (80) which is rotatably disposed on the other of the sprung portion and the unsprung portion and which is screwed with the threaded rod and (c) a rod-rotation inhibiting member (82) which includes a fitting portion configured to be fitted in the axial groove and which is disposed on the other of the sprung portion and the unsprung portion, the rod-rotation inhibiting member being configured to inhibit the threaded rod from rotating while permitting the threaded rod to move in the axis direction. In the electromagnetic absorber, the threaded groove is not formed at a section of a fitting range at which the fitting portion is fitted in the axial groove when the fitting portion is located at an end of the fitting range that extends in the axis direction on the outer circumferential portion of the threaded rod.

16 Claims, 8 Drawing Sheets

(56) References Cited

FOREIGN PATENT DOCUMENTS

| JP | 7-37765 | 8/1995 |
|---|---|---|
| JP | 11141644 A * | 5/1999 |
| JP | 2006 143146 | 6/2006 |
| JP | 2007-203933 A | 8/2007 |
| WO | WO 03/095851 A1 | 11/2003 |
| WO | WO 2007043352 A1 * | 4/2007 |
| WO | 2008 044384 | 4/2008 |

* cited by examiner

ELECTROMAGNETIC SHOCK ABSORBER FOR VEHICLE

TECHNICAL FIELD

The present invention relates to an electromagnetic shock absorber for a vehicle configured to generate, by an electromagnetic motor, a resistance force with respect to a relative movement of a sprung portion and an unsprung portion.

BACKGROUND ART

In the field of vehicles, there has been recently developed an electromagnetic shock absorber (hereinafter abbreviated as "absorber" where appropriate) configured to generate a resistance force with respect to a relative movement of a sprung portion and an unsprung portion, based on a force generated by an electromagnetic motor. An absorber disclosed in the following Patent Document 1 is one example of the electromagnetic absorber. The disclosed absorber employs a screw mechanism to convert a rotational force of the electromagnetic motor into the resistance force with respect to the relative movement of the sprung portion and the unsprung portion.
[Patent Document 1] JP-A-2006-143146

DISCLOSURE OF THE INVENTION (A) Summary of the Invention

Some electromagnetic absorbers that employ the screw mechanism are equipped with a rotation inhibiting mechanism configured as follows. In order to efficiently convert a rotational force of one of a threaded rod and a nut into a force of the other of the threaded rod and the nut in its axis direction, the rotation inhibiting mechanism is configured to inhibit the other of the threaded rod and the nut from rotating about the axis. A rotational force about the axis acts on the rotation inhibiting mechanism when the absorber extends and contracts. When the extending or contracting movement of the absorber abruptly stops, such as upon full bounding and upon full rebounding, the rotational force that acts on the rotation inhibiting mechanism tends to become comparatively large due to the inertia or the like of the one of the threaded rod and the nut. Because the electromagnetic absorber that employs the screw mechanism is still under development, the absorber experiences various problems such as the large rotational force that acts on the rotation inhibiting mechanism and therefore, there is plenty of room for modification to improve the utility of the absorber. The present invention has been made in view of the situations described above. It is therefore an object of the invention to provide an electromagnetic absorber having a high degree of utility.

To achieve the object indicated above, an electromagnetic absorber for a vehicle according to the present invention is arranged to have (a) a threaded rod which is immovably disposed on one of a sprung-side unit and an unsprung-side unit and which includes a threaded groove formed in its outer circumferential portion and an axial groove extending in its axis direction (b) a nut which is rotatably disposed on the other of the sprung-side unit and the unsprung-side unit and which is screwed with the threaded rod and (c) a rod-rotation inhibiting member which includes a fitting portion configured to be fitted in the axial groove and which is fixedly disposed on the other of the sprung-side unit and the unsprung-side unit, the rod-rotation inhibiting member being configured to inhibit the threaded rod from rotating while permitting the threaded rod to move in the axis direction. The electromagnetic absorber is configured to generate a resistance force with respect to a relative movement of the sprung-side unit and the unsprung-side unit by giving a rotational force to the nut based on a motor force. In the electromagnetic absorber, the threaded groove is not formed in a section of a fitting range at which the fitting portion is fitted in the axial groove when the fitting portion is located at an end of the fitting range that extends in the axis direction on an outer circumferential portion of the threaded rod.

The rod-rotation inhibiting member as a rotation inhibiting mechanism is configured to inhibit the threaded rod from rotating about its axis by abutting contact of the fitting portion with side walls of the axial groove. Where the threaded groove is formed over an entirety of the outer circumferential portion of the threaded rod in the axis direction, the threaded groove intersects the axial groove over an entirety of the axial groove. Therefore, there exist, over the entirety of the axial groove, portions in which the side walls of the axial groove are not present. (Hereinafter, those portions are referred to as "wall-less portions" where appropriate.) Accordingly, in the absorber that employs the threaded rod in which the threaded groove is formed over the entirety of the outer circumferential portion in the axis direction, the fitting portion is inevitably fitted in a part of the axial groove at which the wall-less portions exist, so that only a part of the fitting portion suffers from a large load. In the absorber according to the present invention, at least one of upon full bounding and upon full rebounding in each of which a relatively large rotational force acts on the rod-rotation inhibiting member, the rotation of the threaded rod about the axis is inhibited by the abutting contact of the fitting portion with a part of the axial groove at which no wall-less portions exist, resulting in a highly reliable absorber. Owing to such advantages, the absorber of the present invention ensures high utility.

(B) Forms of Claimable Invention

There will be explained various forms of an invention which is considered claimable (hereinafter referred to as "claimable invention" where appropriate). Each of the forms of the invention is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following descriptions of various forms and preferred embodiments. It is to be further understood that any form in which one or more elements is/are added to or deleted from any one of the following forms may be considered as one form of the claimable invention.

Each of the following forms (1)-(5) indicates a construction on which the claimable invention is based. Forms in which the technical features of any of the forms that follow the forms (1)-(5) are added to any of the forms (1)-(5) correspond to forms of the claimable invention.

(1) An electromagnetic shock absorber for a vehicle, comprising:

a sprung-side unit connected to a sprung portion;

an unsprung-side unit which is connected to an unsprung portion and which is permitted to move relative to the sprung-side unit in association with a relative movement of the sprung potion and the unsprung portion;

a screw mechanism including: (a) a threaded rod which is disposed immovably on one of the sprung-side unit and the unsprung-side unit and which has a threaded groove formed in an outer circumferential portion thereof; and (b) a nut which is disposed immovably on the other of the sprung-side unit and the unsprung-side unit and which is screwed with the threaded rod, the screw mechanism being configured such that one of the threaded rod and the nut rotates in association with a relative movement of the sprung-side unit and the unsprung-side unit; and an electromagnetic motor which gives a rotational force to the one of the threaded rod and the nut, wherein the electromagnetic shock absorber is configured to generate, based on the rotational force, a resistance force with respect to the relative movement of the sprung-side unit and the unsprung-side unit.

The above form (1) is a form on which the claimable invention is based and which lists basic constituent elements of the electromagnetic shock absorber (hereinafter abbreviated as "absorber" where appropriate) according to the claimable invention. In the form (1), the screw mechanism constituted by the threaded rod and the nut is employed, and the rotational force of the electromagnetic motor is converted by the screw mechanism into a resistance force with respect to the relative movement of the sprung portion and the unsprung portion.

The "absorber" described in the form (1) is configured to extend and contract in a direction in which the sprung-side unit and the unsprung-side unit move relative to each other. The direction corresponds to the axis direction of the absorber. The "threaded rod" described in the form (1) is disposed along the axis direction of the absorber, and an axis direction of the threaded rod is equal to the axis direction of the absorber. The "movement" described in the form (1) means a movement of the threaded rod and a movement of the absorber, in the axis direction. Each of the "threaded rod" and the "nut" described in the form (1) may or may not be a constituent element of any of the sprung-side unit and the unsprung-side unit.

The electromagnetic shock absorber in the form (1) is not limited to the one configured to generate only the resistance force, but may be configured to generate, in addition to the resistance force, a propulsive force by which the sprung portion and the unsprung portion are positively moved relative to each other and/or a force which prevents the sprung portion and the unsprung portion from moving relative to each other with respect to an externally inputted force. In such an instance, where the electromagnetic shock absorber according to the form (1) is disposed so as to correspond to each of the wheels of the vehicle, it is possible to execute a control based on a so-called skyhook damper theory for generating a damping force with respect to sprung vibration, a posture control for suppressing roll and pith of the vehicle body, and the like.

The "sprung portion" described in the form (1) broadly means a portion of the vehicle body supported by a suspension spring, for instance. The "unsprung portion" described in the form (1) broadly means a constituent element of the vehicle, such as a suspension arm, which vertically moves with a wheel axis. In the present specification, the term "connect" means not only direct connection but also indirect connection in which elements are connected indirectly to each other with a certain component, member, unit or the like interposed therebetween. For instance, where the sprung-side unit and the unsprung-side unit are connected to the sprung portion and the unsprung portion, respectively, those units may be connected directly to the sprung portion and the unsprung portion, respectively, or connected indirectly to the sprung portion and the unsprung portion, respectively, via an elastic connecting member, a hydraulic damper or the like interposed therebetween.

(2) The electromagnetic shock absorber according to the above form (1), wherein the threaded rod is supported, at one end portion thereof, by the one of the sprung-side unit and the unsprung-side unit, the nut is rotatably held by the other of the sprung-side unit and the unsprung-side unit, and the electromagnetic shock absorber is configured such that the electromagnetic motor gives the rotational force to the nut, wherein the threaded rod includes an axial groove extending in an axis direction of the threaded rod, and wherein the electromagnetic shock absorber further comprises a rod-rotation inhibiting member which includes a fitting portion configured to be fitted in the axial groove and which is immovably and unrotatably disposed on the other of the sprung-side unit and the unsprung-side unit, at a position where the fitting portion is fitted in the axial groove on one of opposite sides of a portion of the threaded rod at which the nut is screwed therewith, which one of the opposite sides is near to one of the one end portion and the other end portion of the threaded rod, the rod-rotation inhibiting member being configured to inhibit the threaded rod from rotating relative to the other of the sprung-side unit and the unsprung-side unit while permitting the threaded rod to move relative to the other of the sprung-side unit and the unsprung-side unit in the axis direction.

The above form (2) is limited to an absorber configured such that the electromagnetic motor gives the rotational force to the nut, and the electromagnetic shock absorber according to the form (2) is equipped with the rod-rotation inhibiting member for inhibiting the threaded rod from rotating about its axis while permitting the threaded rod to move in the axis direction. The rod-rotation inhibiting member is disposed on one of opposite sides of the nut which are near to the sprung portion and the unsprung portion, respectively. It is preferable that the rod-rotation inhibiting member be disposed adjacent to the nut for downsizing the absorber in the axis direction. The "rod-rotation inhibiting member" described in the form (2) is not particularly limited in its structure. For instance, the rod-rotation inhibiting member may be configured to have a key as the fitting portion and a key groove (a guide groove) as the axial groove, the key being arranged to be fitted in the key groove. Alternatively, the rod-rotation inhibiting member and the threaded rod may be configured to be spline-fitted.

(3) The electromagnetic shock absorber according to the above form (2), wherein the electromagnetic motor includes a hollow cylindrical motor shaft for holding the nut at one end thereof and is disposed on the other of the sprung-side unit and the unsprung-side unit with the threaded rod penetrating through the motor shaft.

In the above form (3), the structure of the electromagnetic motor is specifically limited. In the form (3), the electromagnetic motor having the hollow cylindrical motor shaft is employed, and the threaded rod penetrates through the motor shaft. Accordingly, the electromagnetic absorber can be made compact in the axis direction.

(4) The electromagnetic shock absorber according to the above form (2) or (3), wherein the rod-rotation inhibiting member is a ball spline nut which holds a plurality of bearing balls that roll in the axial groove and through which the threaded rod penetrates, and wherein the fitting portion is constituted by the plurality of bearing balls.

In the above form (4), the threaded rod is inhibited from rotating about the axis while permitted to move in the axis direction by a ball spline mechanism. The form (4) ensures a smooth relative movement of the threaded rod and the rod-rotation inhibiting member, for instance.

(5) The electromagnetic shock absorber according to any one of the above forms (2)-(4), wherein the rod-rotation inhibiting member is disposed at the position where the fitting portion is fitted in the axial groove on one side of the portion of the threaded rod at which the nut is screwed therewith, which one side is near to the one end portion of the threaded rod.

In the above form (5), the location at which the rod-rotation inhibiting member is disposed is specifically limited. The rod-rotation inhibiting member is fixedly disposed on the other of the sprung-side unit and the unsprung-side unit for inhibiting the rotation of the threaded rod that is disposed, at its one end portion, on the one of the sprung-side unit and the unsprung-side unit. In the form (5), the rod-rotation inhibiting member is disposed between the nut and the one of the sprung-side unit and the unsprung-side unit. Accordingly, it is possible to prevent the rotational force that the threaded rod receives from the nut upon extension and contraction of the absorber from being transmitted to the one of the sprung-side unit and the unsprung-side unit.

(6) The electromagnetic shock absorber according to any one of the above forms (2)-(5),
wherein a range which extends in the axis direction on the outer circumferential portion of the threaded rod and within which the fitting portion is allowed to be fitted in the axial groove in association with the relative movement of the sprung-side unit and the unsprung-side unit in an instance where the axial groove is present in the range is defined as a fitting range, and
wherein the threaded groove is not formed in a section of the fitting range at which the fitting portion is fitted in the axial groove when the fitting portion is located at an end of the fitting range near to the one of the one end portion and the other end portion of the threaded rod.

When the threaded rod and the nut are assembled, namely, when the nut is screwed with the threaded rod, the nut is screwed initially from an end portion of the threaded rod so as to be assembled on the threaded rod. Accordingly, there exists an absorber in which the threaded rod is formed over an entirety of its outer circumferential portion in the axis direction for permitting the nut to be screwed from either one of opposite end portions of the threaded rod in order to simplify the process of assembling the absorber. In the thus structured threaded rod, however, the threaded rod intersects the axial groove over an entirety of the axial groove, so that there exist, over the entirety of the axial groove, the above-indicated wall-less portions at which the side walls of the axial groove are not present. In this regard, the rod-rotation inhibiting member is configured to inhibit the rotation of the threaded rod about the axis by the abutting contact of the fitting portion with the side walls of the axial groove. Therefore, in the absorber that employs the threaded rod in which the threaded groove is formed over the entirety of its outer circumferential portion in the axis direction, the fitting portion is inevitably fitted in a section of the axial groove at which the wall-less portions exist, so that only a part of the fitting portion suffers from a large load. In the absorber according to the present invention, at least one of upon full bounding and upon full rebounding in each of which a relatively large rotational force acts on the rod-rotation inhibiting member, the rotation of the threaded rod about the axis is inhibited by the abutting contact of the fitting portion with a section of the axial groove at which no wall-less portions exist. Further, during the manufacture of the threaded rod, the threaded groove is not formed in the specific range of its outer circumferential portion, thereby reducing labor and cost of forming the threaded groove. The "range" described in the form (6) means a region of the outer circumferential portion of the threaded rod in the axis direction.

In the absorber configured such that the rotation of the threaded rod about the axis is inhibited while the movement thereof in the axis direction is permitted, owing to the ball spline mechanism, the bearing balls located at the wall-less portions of the axial groove do not contact the side walls of the axial groove and only the bearing balls located at wall-existing portions of the axial groove at which the side walls exist contact the side walls, when the rotation of the threaded rod is inhibited. In other words, only a part of the bearing balls that are fitted in the axial groove contact the side walls of the axial groove when the rotation of the threaded rod is inhibited. Even if the absorber is thus structured, the form (6) allows all of the bearing balls that are fitted in the axial groove to be brought into abutting contact with the side walls of the axial groove upon full bounding or upon full rebounding in which a relatively large rotational force tends to act on the rod-rotation inhibiting member. Accordingly, the form (6) is suitable for the absorber in which the threaded rod is inhibited from rotating about the axis while permitted to move in the axis direction, by the ball spline mechanism.

While a relatively large rotational force acts on the rod-rotation inhibiting member in both of upon full bounding and upon full rebounding, the large rotational force acts on the rod-rotation inhibiting member more frequently upon full bounding than upon full rebounding, due to a thrusting shock from irregular road surfaces and the like. In the absorber in which the rod-rotation inhibiting member is disposed between the nut and one of the sprung-side unit and the unsprung-side unit, the fitting portion can contact, upon full bounding, the section of the axial groove at which no wall-less portions exist, according to the form (6). Accordingly, the form (6) is suitable for the absorber in which the rod-rotation inhibiting member is disposed between the nut and one of the sprung-side unit and the unsprung-side unit.

(7) The electromagnetic shock absorber according to the above form (6),
wherein a range which extends in the axis direction on the outer circumferential portion of the threaded rod and within which the nut is allowed to be screwed with the threaded groove in association with the relative movement of the sprung-side unit and the unsprung-side unit in an instance where the threaded groove is present in the range is defined as a screwing range, and
wherein the threaded groove is formed only in the screwing range.

In the above form (7), the range in which the threaded rod is formed on the outer circumferential portion of the threaded rod is more specifically limited. According to the form (7), the range in which the threaded groove is formed is further limited on the outer circumferential portion of the threaded rod, thereby reducing labor and cost for forming the threaded groove, for instance.

(8) The electromagnetic shock absorber according to the above form (6) or (7),
wherein a range which extends in the axis direction on the outer circumferential portion of the threaded rod and within which the nut is allowed to be screwed with the threaded groove in association with the relative movement of the sprung-side unit and the unsprung-side unit in an instance where the threaded groove is present in the range is defined as a screwing range, and wherein the axial groove is not formed in a section of the screwing range at which the nut is screwed with the threaded groove when the nut is located at an end of the screwing range near to the other of the one end portion and the other end portion of the threaded rod.

(9) The electromagnetic shock absorber according to any one of the above forms (6)-(8), wherein the axial groove is formed only in the fitting range.

In the above forms (8) and (9), the range in which the axial groove is formed on the outer circumferential portion of the threaded rod is limited. According to the above forms, the range in which the axial groove is formed is limited on the outer circumferential portion of the threaded rod, thereby reducing labor and cost for forming the axial groove, for instance.

(10) The electromagnetic shock absorber according to any one of the above forms (2)-(9), wherein a range which extends in the axis direction on the outer circumferential portion of the threaded rod and within which the fitting portion is allowed to be fitted in the axial groove in association with the relative movement of the sprung-side unit and the unsprung-side unit in an instance where the axial groove is present in the range is defined as a fitting range, and wherein a clearance between the axial groove and the fitting portion is made smaller at opposite end portions of the fitting range than an intermediate portion between the opposite end portions.

Where the clearance between the inner wall of the axial groove and the fitting portion is made small, there is generated a resistance force with respect to the relative movement of the threaded rod and the rod-rotation inhibiting member, whereby there is generated a resistance force with respect to extension and contraction of the absorber. In the form (10), therefore, the resistance force with respect to the relative movement of the threaded rod and the rod-rotation inhibiting member can be generated in the vicinity of the stroke ends of the absorber, thereby reducing the stroke speed of the absorber. According to the form (10), it is possible to mitigate a shock to the absorber upon full bounding and upon full rebounding, for instance. The "clearance" described in this form includes a minus or negative clearance. The concept that the clearance is small should be interpreted as including a concept that the minus clearance is large.

The above form (10) is realized by making the dimension or dimensions of the axial groove in a plane perpendicular to the axis direction of the threaded rod is made smaller at the opposite end portions of the fitting range than at the intermediate portion located therebetween. The above-indicated dimension or dimensions of the axial groove specifically includes a depth of the groove, a width of the groove, and a cross sectional area of the groove in the plane perpendicular to the axis direction of the threaded rod. The "clearance" described in the form (10) may become small gradually or abruptly at the opposite end portions of the fitting range. Alternatively, the clearance may become small gradually from the intermediate portion toward the opposite end portions.

(11) The electromagnetic shock absorber according to any one of the above forms (1)-(10), wherein a range which extends in the axis direction on the outer circumferential portion of the threaded rod and within which the nut is allowed to be screwed with the threaded groove in association with the relative movement of the sprung-side unit and the unsprung-side unit in an instance where the threaded groove is present in the range is defined as a screwing range, and wherein a clearance between the threaded groove and the nut is made smaller at opposite end portions of the screwing range than an intermediate portion between the opposite end portions.

According to the above form (11), there is generated, in the vicinity of the stroke ends of the absorber, a resistance force with respect the relative movement of the threaded rod and the nut. As in the preceding form, the stroke speed of the absorber can be reduced in the vicinity of the stroke ends of the absorber, thereby mitigating a shock to the absorber upon full bounding and upon full rebounding, according to the form (11).

(12) The electromagnetic shock absorber according to any one of the above forms (1)-(11), wherein the nut holds a plurality of bearing balls that roll in the threaded groove, and the screw mechanism is a ball screw mechanism.

According to the above form (12), the threaded rod and the nut smoothly rotate and move relative to each other, ensuring a smooth stroke of the absorber.

(13) The electromagnetic shock absorber according to any one of the above forms (1)-(12), further comprising: an elastic connecting member for elastically interconnecting (a) the one of the sprung-side unit and the unsprung-side unit and (b) one of the sprung portion and the unsprung portion to which the one of the sprung-side unit and the unsprung-side unit is connected; and a damper which is disposed in parallel with the elastic connecting member so as to generate a damping force with respect to a relative movement of the one of the sprung-side unit and the unsprung-side unit; and the one of the sprung portion and the unsprung portion.

The above form (13) limits the connection structure between: the one of the sprung-side unit and the unsprung-side unit; and one of the sprung portion and the unsprung portion to which the one of the sprung-side unit and the unsprung-side unit is connected. The form (13) can realize an absorber capable of effectively absorbing a high-frequency vibration that the operation of the electromagnetic motor cannot follow, such as a vibration in a range of the unsprung resonance frequency. Where the connection structure according to the above form (13) is employed, the rotation of the threaded rod may not be reliably inhibited due to the connection structure depending upon the configuration of the connection structure. Accordingly, the rod-rotation inhibiting member is suitable for the electromagnetic absorber having the above-described connection structure.

(14) The electromagnetic shock absorber according to the above form (13), wherein the damper includes: a housing which is supported by the one of the sprung portion and the unsprung portion and which accommodates a working fluid in an inside thereof; a piston which divides the inside of the housing into two fluid chambers and which is movable in the housing; a piston rod having one end connected to the piston and the other end extending from the housing so as to be connected integrally to one end portion of the threaded rod at which the threaded rod is supported by the one of the sprung-side unit and the unsprung-side unit; and a flow-resistance giving mechanism which gives a resistance against a flow of the working fluid between the two fluid chambers in association with a movement of the piston.

In the above form (14), the structure of the damper is specifically limited. Where the threaded rod is connected to the one of the sprung portion and the unsprung portion via the damper having the structure described in the form (14), the piston is generally allowed to rotate in the housing, thereby causing a risk that the threaded rod rotates about the axis relative to the other of the sprung portion and the unsprung portion. Therefore, the rod-rotation inhibiting member is suitable for the electromagnetic absorber having the damper described in the form (14), as explained above. The "threaded rod" and the "piston rod" in the form (14) may be fixedly connected via a some kind of member interposed therebetween or may be constituted as an integral member in which the threaded rod and the piston rod are directly connected.

(15) The electromagnetic shock absorber according to any one of the above forms (1)-(14), wherein the one of the sprung-side unit and the unsprung-side unit is the unsprung-side unit while the other of the sprung-side unit and the unsprung-side unit is the sprung-side unit.

In the form (15), where the absorber is configured such that the electromagnetic motor gives the rotational force to the nut, the electromagnetic motor is disposed on the sprung portion. Accordingly, it is possible to reduce transmission of a vibration and a shock from the unsprung portion to the electromagnetic motor.

(16) The electromagnetic shock absorber according to any one of the above forms (1)-(15), further comprising at least one of a first movement-inhibiting mechanism for inhibiting the relative movement of the sprung portion and the unsprung portion toward each other beyond a prescribed distance; and a second movement-inhibiting mechanism for inhibiting the relative movement of the sprung portion and the unsprung portion away from each other beyond a prescribed distance.

According to the form (16), at least one of a so-called bound stopper and rebound stopper is provided. The bound stopper is for inhibiting the sprung portion and the unsprung portion from moving toward each other more than specified while the rebound stopper is for inhibiting the sprung portion and the unsprung portion from moving away from each other more than specified. The bound stopper and the rebound stopper define the above-indicated fitting range and screwing range. A state in which the sprung portion and the unsprung portion are inhibited from moving toward each other more than specified by the bound stopper is considered as a state of full bounding. A state in which the sprung portion and the unsprung portion are inhibited from moving away from each other more than specified by the rebound stopper is considered as a state of full rebounding.

Each of the "first movement-inhibiting mechanism" and the "second movement-inhibiting mechanism" is not limited to a structure in which the relative movement of the sprung portion and the unsprung portion is inhibited by direct or indirect contact of these portions, but may be structured to inhibit the relative movement of the sprung portion and the unsprung portion by direct or indirect contact of the sprung-side unit and the unsprung-side unit. Further, each of the first movement-inhibiting mechanism and the second movement-inhibiting mechanism may be structured to bring the sprung portion and the unsprung-side unit into direct or indirect contact or to bring the unsprung portion and the sprung-side unit into direct or indirect contact. It is noted that the prescribed distance set for inhibiting the movement toward each other and the prescribed distance set for inhibiting the movement away from each other are made different from each other.

BEST MODE FOR CARRYING OUT THE INVENTION

Figure 1:
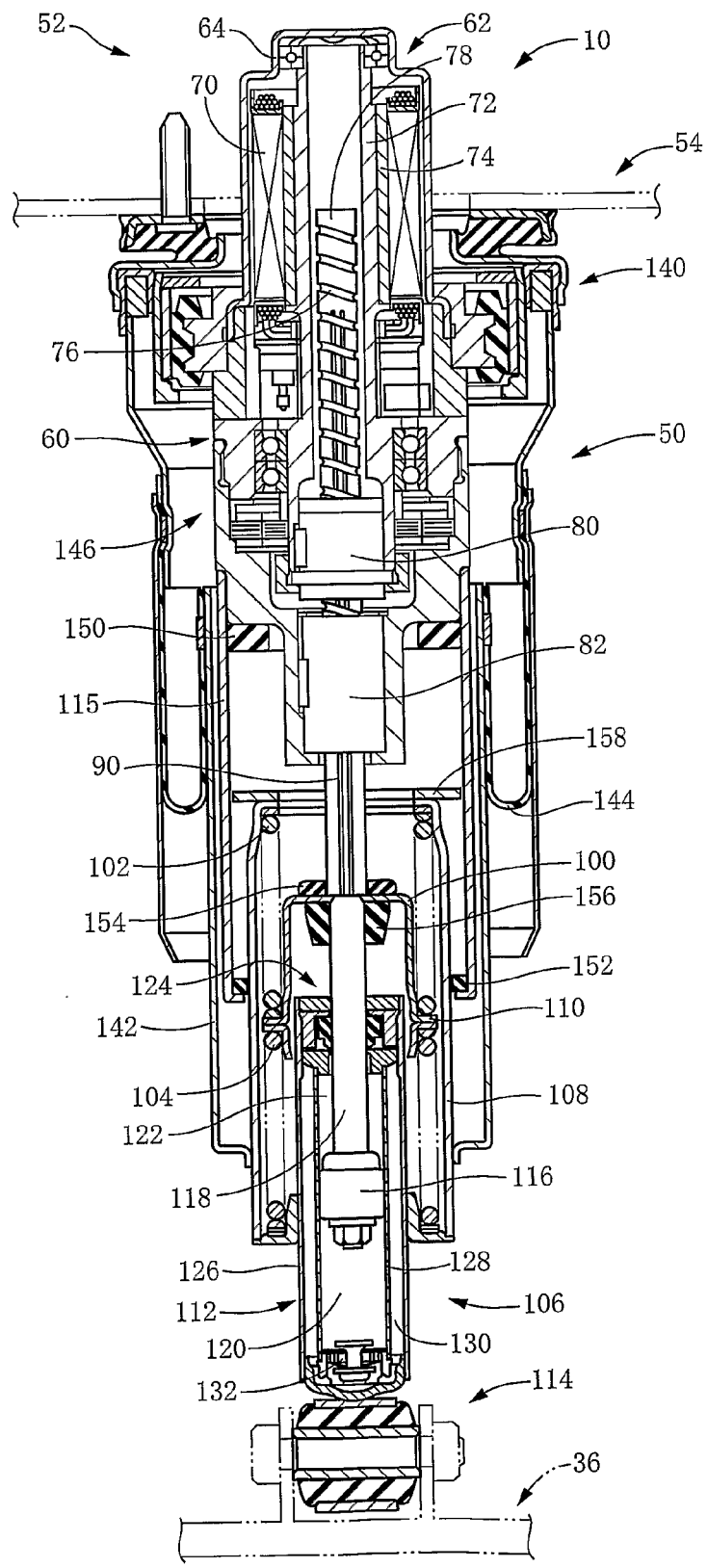
FIG. 1 is a cross-sectional view of an electromagnetic shock absorber for a vehicle according to a first embodiment of the claimable invention.

There will be described in detail some embodiments according to the claimable invention, referring to the drawings. It is to be understood, however, that the claimable invention is not limited to the details of the following embodiments but may be embodied with various changes and modifications, such as those described in the FORMS OF THE CLAIMABLE INVENTION, which may occur to those skilled in the art.

1. First Embodiment 1-1. Construction of Electromagnetic Shock Absorber

Figure 2:
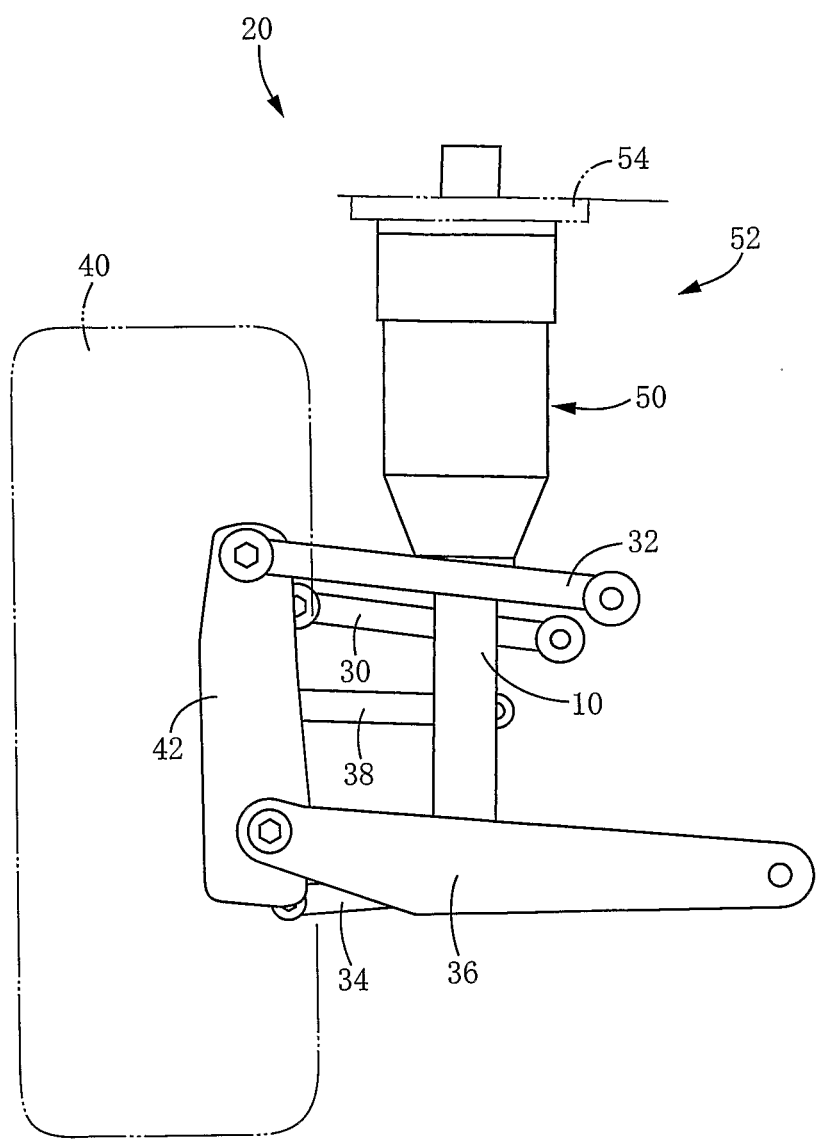
FIG. 2 is a view showing a suspension apparatus in which the electromagnetic shock absorber of FIG. 1 is disposed.

FIG. 1 shows a shock absorber 10 (hereinafter simply referred to as "absorber" where appropriate) for a vehicle according to a first embodiment of the claimable invention. The absorber 10 is installed on the vehicle as one constituent element of an independent suspension apparatus 20, as shown in FIG. 2, for instance. The suspension apparatus 20 of FIG. 2 is of a multilink type and includes a first upper arm 30, a second upper arm 32, a first lower arm 34, a second lower arm 36, and a toe control arm 38, each as a suspension arm. One end of each of these five arms 30, 32, 34, 36, 38 is rotatably connected to a body of the vehicle while the other end is rotatably connected to an axle carrier 42 that rotatably holds a wheel 40. Owing to the five arms 30, 32, 34, 36, 38, the axle carrier 42 is permitted to be vertically moved relative to the vehicle body along a substantially constant locus.

In the thus constructed suspension apparatus 20, the absorber 10 is disposed in parallel with an air spring 50. More specifically explained, a spring•absorber Assay 52 in which the absorber 10 and the air spring 50 are integrated or unified is disposed between: a mount portion 54 which is provided on a tire housing and which is one constituent component of a sprung portion; and the second lower arm 36 as one constituent component of an unsprung portion.

As shown in FIG. 1, the absorber 10 includes a generally cylindrical housing tube 60 and an electromagnetic motor 62 disposed above the housing tube 60. The housing tube 60 is fixedly connected, at its upper end, to a motor casing 64 accommodating the electromagnetic motor 62. The motor casing 64 is connected to the mount portion 54 at its outer circumferential portion via a cushion rubber.

The electromagnetic motor 62 includes: a plurality of coils 70 fixedly disposed on one circumference along an inner wall surface of the motor casing 64; a hollow cylindrical motor shaft 72 rotatably held by the motor casing 64 and the housing tube 60; and a plurality of permanent magnets 74 fixedly disposed on an outer circumference of the motor shaft 72 so as to face the coils 70. The electromagnetic motor 62 is a three-phase brushless motor that includes a stator having the coils 70 and a rotor having the permanent magnets 74.

The absorber 10 includes, in the housing tube 60, a threaded rod 78 having a threaded groove 76 formed in its outer circumferential portion and a nut 80 which holds a plurality of bearing balls and which is screwed with the threaded rod 78. The threaded rod 78 and the nut 80 cooperate with each other to constitute a ball screw mechanism. The threaded rod 78 is disposed in the housing tube 60 so as to extend in a vertical direction while penetrating through the motor shaft 72 of the electromagnetic motor 62. The nut 80 is fixedly fitted to a lower end of the motor shaft 72 while being screwed with the threaded rod 78.

Figure 3:
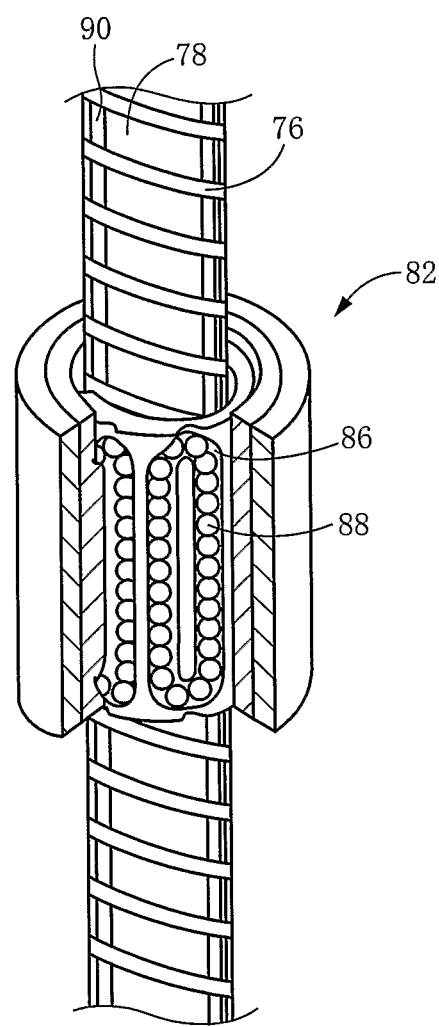
FIG. 3 is a view showing a structure of a rod-rotation inhibiting member of the electromagnetic shock absorber of FIG. 1.

The absorber 10 includes a ball spline nut (hereinafter abbreviated as "spline nut" where appropriate) 82 as a rod-rotation inhibiting member for inhibiting the threaded rod 78 from rotating about its axis. The spline nut 82 is fixed to a lower end portion of the housing tube 60, and the threaded rod 78 penetrates through the spline nut 82. As shown in FIG. 3, the spline nut 82 is formed with a plurality of ball circulating paths 86 in each of which a plurality of bearing balls 88 are held so as to circulate in the path 86. The threaded rod 78 is formed with spline grooves 90 each as an axial groove extending in the axis direction of the threaded rod 78 so as to respectively face the ball circulating paths 86. The bearing balls 88 as a fitting portion are configured to be fitted in the spline grooves 90. In the present absorber 10, the thus constructed ball spline mechanism inhibits the threaded rod 78 from rotating about its axis while permitting the movement of the threaded rod 78 in the axis direction.

The threaded rod 78 is fixed at its lower end to an upper surface of a rod support member 100 having a generally cylindrical shape and closed at its one end. The rod support member 100 is elastically supported by a generally cylindrical damper cover 108 covering a damper 106 (which will be explained) through two compression coil springs 102, 104, so as to be accommodated in the damper cover 108. To be more specific, the rod support member 100 has, at its lower end, a flange portion 110. The spring 102 is held between the flange portion 110 and an upper end portion of the damper cover 108 in a compressed state while the spring 104 is held between the flange portion 110 and a lower end portion of the damper cover 108 in a compressed state. Owing to the elastic force of the springs 102, 104, the rod support member 100 is elastically supported by the damper cover 108. The damper cover 108 is fixed, at its lower end portion, to the damper 106, more specifically, to an outer circumferential portion of a damper housing 112 (which will be explained) as one constituent element of the damper 106. The damper 106 is connected, at its lower end, to the second lower arm 36 via a mount bush 114. In other words, the rod support member 100 is elastically connected to the unsprung portion by the compression coil springs 102, 104, and the absorber 10 is equipped with an elastic connecting member constituted by the compression coil springs 102, 104 and so on. To an outer circumferential surface of a lower portion of the housing tube 60, a cylindrical cover tube 115 is fixed, and the damper cover 108 is inserted into the cover tube 115 from a lower end portion of the same 115.

The damper 106 includes the damper housing 112 accommodating a working fluid, a piston 116 fluid-tightly and slidably fitted in an inside of the damper housing 112, and a piston rod 118 connected at its lower end to the piston 116 and extending, at its upper end, upward beyond the top of the damper housing 112. The inside of the damper housing 112 is divided into a lower chamber 120 located on a lower side of the piston 116 and an upper chamber 122 located on an upper side of the piston 116. The piston rod 118 penetrates through a cap portion 124 disposed on the upper portion of the damper housing 112 and is held in sliding contact with the cap portion 124 via a seal. The piston rod 118 is fixed, at its upper end, to a lower surface of the closed end of the rod support member 100. That is, the upper end of the piston rod 118 is fixedly connected to the lower end of the threaded rod 78 so as to be immovable and unrotatable relative to the threaded rod 78.

The damper 106 has a structure similar to that of a twin-tube type shock absorber. The damper housing 112 includes an outer tube 126 and an inner tube 128 between which a reservoir 130 is formed. The piston 116 is fluid-tightly and slidably fitted in the inner tube 128. The damper 106 is configured to permit the working fluid to flow between the two fluid chambers 120, 122 in association with the movement of the piston 116, through a communication passage formed in the piston 116 so as penetrate therethrough in the vertical direction. The damper 106 is configured also to give a resistance to the flow of the working fluid between the two fluid chambers 120, 122 by an orifice formed in the communication passage. Further, a base valve member 132 disposed between the lower chamber 120 and the reservoir 130 is configured to give a resistance to a flow of the working fluid between the lower chamber 120 and the reservoir 130. The thus constructed damper 106 is equipped with a flow-resistance giving mechanism constituted by the communication passage formed in the piston 116, the base valve member, and so on.

The air spring 50 is constituted by a chamber shell 140 fixed to the mount portion 54, an air piston cylinder 142 connected to the second lower arm 36, and a diaphragm 144 connecting the chamber shell 140 and the air piston cylinder 142. The chamber shell 140 is a generally cylindrical member having a lid portion. The chamber shell 140 is fixed, at an upper surface of the lid portion thereof, to an underside of the mount portion 54 via a cushion rubber, such that the motor casing 64 of the absorber 10 passes through a hole formed in the lid portion. The air piston cylinder 142 is fixed, at its lower end, to an outer circumferential portion of the damper cover 108 with the cover tube 115 accommodated therein. One end of the diaphragm 144 is fixed to a lower end of the chamber shell 140 while the other end is fixed to an upper end of the air piston cylinder 142, whereby the chamber shell 140 and the air piston cylinder 142 are connected to each other so as to maintain an air tightness therebetween by the diaphragm 144. That is, the chamber shell 140, the air piston cylinder 142, and diaphragm 144 cooperate with each other to define a pressure chamber 146. There is connected, to the pressure chamber 146, an air supply and discharge device configured to supply and discharge a compressed air to and from the pressure chamber 146. Because the structure of the air supply and discharge device is known in the art, its detailed explanation is not given here.

An annular cushion rubber 150 is attached to a lower end of the housing tube 60. An annular cushion rubber 152 is attached to an inner wall surface of a lower end of the cover tube 115. An annular cushion rubber 154 is attached to an upper surface of the closed end of the rod support member 100. An annular cushion rubber 156 is attached to the lower surface of the closed end of the rod support member 100.

1.2. Function and Control of Electromagnetic Shock Absorber

In the thus constructed absorber 10, a sprung-side unit connected to the mount portion 54 is constituted by the housing tube 60, the motor casing 64, the cover tube 115, and so on while an unsprung-side unit connected to the second lower arm 36 is constituted by the rod support member 100, and so on. The sprung-side unit and the unsprung-side unit are configured to be movable relative to each other. When the sprung portion and the unsprung portion move relative to each other, the sprung-side unit and the unsprung-side unit move relative to each other while, at the same time, the nut 80 and the threaded rod 78 move relative to each other and the nut 80 rotates. The electromagnetic motor 62 is configured to give a rotational force to the nut 80, and the absorber 10 is capable of generating a resistance force with respect to the relative movement of the sprung portion and the unsprung portion, owing to the rotational force. The resistance force acts as a damping force for damping a relative vibration of the sprung portion and the unsprung portion. In other words, the absorber 10 is configured to generate the damping force with respect to the relative vibration of the sprung portion and the unsprung portion, based on a motor force generated by the electromagnetic motor 62.

A concrete control will be explained. The electromagnetic motor 62 is connected to a battery via an inverter as a drive circuit. The inverter is connected to a control device. The control device controls the inverter, thereby controlling the damping force generated by the absorber 10. Thus, the relative vibration of the sprung portion and the unsprung portion is damped. More specifically explained, there is connected, to the control device, a stroke sensor for detecting a distance between the sprung portion and the unsprung portion. The control device calculates a relative speed of the sprung portion and the unsprung portion based on the distance therebetween detected by the stroke sensor, and calculates the damping force to be generated in accordance with the calculated relative speed. The control device sends a command based on the calculated damping force to the inverter, and the inverter controls switching elements thereof, thereby controlling an electric current passing through the electromagnetic motor 62. Thus, the absorber 10 generates an intended damping force.

The absorber 10 has a function of moving the sprung portion and the unsprung portion toward and away from each other and a function of maintaining the distance between the sprung portion and the unsprung portion at a suitable value, based on the motor force. That is, the absorber 10 has a function as an actuator. Owing to the function, it is possible to execute a control based on a skyhook damper theory in which the damping force in accordance with a sprung absolute speed is applied with respect to the vibration of the sprung portion, to effectively suppress roll of the vehicle body upon turning and pitch of the vehicle body upon acceleration or deceleration, and to adjust a height of the vehicle.

As explained above, the operation of the electromagnetic motor 62 is controlled, whereby the absorber 10 generates an appropriate damping force. However, when the frequency of the relative vibration of the sprung portion and the unsprung portion becomes high to a certain extent, the operation of the electromagnetic motor 62 does not follow the vibration due to some factors such as control responsiveness of the electromagnetic motor 62. In this instance, a sufficient damping effect may not be obtained based on the force generated by the absorber 10. In view of this, in the present absorber 10, the unsprung-side unit is elastically supported by the unsprung portion, and the damper 106 for generating the damping force with respect to the relative movement of the unsprung-side unit and the unsprung portion is provided, for the purpose of effectively absorbing the high-frequency vibration such as a vibration in an unsprung resonance frequency range.

Since the sprung-side unit is elastically supported by the unsprung portion, the threaded rod 78 is also elastically supported by the unsprung portion. Accordingly, the present absorber 10 employs the above-described ball spline mechanism for inhibiting the threaded rod 78 from rotating about its axis. More specifically explained, when the threaded rod 78 and the nut 80 rotate and move relative to each other, the rotational force acts on the threaded rod 78. In this instance, the bearing balls 88 of the spline nut 82 come into abutting contact with side walls of the spline grooves 90, whereby the threaded rod 78 is inhibited from rotating about its axis.

The pressure chamber 146 of the air spring 50 is filled with compressed air. Accordingly, the air spring 50 elastically supports the second lower arm 36 and the mount portion 54 relative to each other, namely, elastically supports the sprung portion and the unsprung portion relative to each other, owing to the pressure of the compressed air.

In the present suspension apparatus 20, the operation of the air supply and discharge device for supplying and discharging the compressed air to and from the pressure chamber 146 is controlled, whereby the air amount in the pressure chamber 146 can be adjusted. By adjusting the air amount, the distance between the sprung portion and the unsprung portion in the vertical direction is changed, thereby making it possible to change the vehicle height. More specifically, the air amount in the pressure chamber 146 is increased so as to increase the vehicle height while the air amount is decreased so as to decrease the vehicle height.

When the sprung portion and the unsprung portion approach each other to a certain extent, an annular member 158 disposed at the upper end of the damper cover 108 is brought into contact with the lower surface of the housing tube 60 via the cushion rubber 150 or the lower surface of the housing tube 60 is brought into contact with the upper surface of the rod support member 100 via the cushion rubber 154. On the other hand, when the sprung portion and the unsprung portion move away from each other to a certain extent, the annular member 158 is brought into contact with a flange portion of the cover tube 115 formed at its lower end, via the cushion rubber 152, or the upper surface of the cap portion 124 of the damper housing 112 is brought into contact with the lower surface of the closed end of the rod support member 100 via the cushion rubber 156. In other words, the present absorber 10 is equipped with a first movement-inhibiting mechanism, namely, a bound stopper, for inhibiting the sprung portion and the unsprung portion from moving toward each other beyond a prescribed distance therebetween, and a second movement-inhibiting mechanism, namely, a rebound stopper, for inhibiting the sprung portion and the unsprung portion from moving away from each other beyond a prescribed distance therebetween.

1.3. Threaded Groove and Spline Grooves of Threaded Rod

As described above, the present absorber 10 has a so-called rebound stopper and bound stopper, thereby limiting a range within which the absorber 10 extends and contracts. Accordingly, when the absorber 10 extends and contracts, a range within which the nut 80 is movable on the outer circumferential portion of the threaded rod 78 in the axis direction is limited, namely, a range within which the nut 80 is screwed with the threaded groove 76 is limited. Hereinafter the range will be referred to as "screwing range" where appropriate. Further, when the absorber 10 extends and contracts, a range within which the spline nut 82 is movable on the outer circumferential portion of the threaded rod 78 in the axis direction is limited, namely, a range within which the plurality of bearing balls 88 of the spline nut 82 are fitted in the spline grooves 90 is limited. Hereinafter the range will be referred to as "fitting range" where appropriate.

More specifically explained, when the sprung portion and the unsprung portion are inhibited from moving toward each other beyond the prescribed distance therebetween, namely, upon full bounding, as a result of the contact of the lower surface of the housing tube 60 with the upper surface of the rod support member 100 via the cushion rubber 154, the nut 80 and the spline nut 82 approach the most closely to the proximal end portion of the threaded rod 78. On the other hand, when the sprung portion and the unsprung portion are inhibited from moving away from each other beyond the prescribed distance therebetween, namely, upon full rebounding, as a result of the contact of the annular member 158 with the flange portion of the cover tube 115 formed at its lower end via the cushion rubber 152 and the contact of the upper surface of the cap portion 124 of the damper housing 112 with the lower surface of the closed end of the rod support member 100 via the cushion rubber 156, the nut 80 and the spline nut 82 approach the most closely to the leading end portion of the threaded rod 78. In this way, the screwing range and the fitting range are limited.

Figure 4:
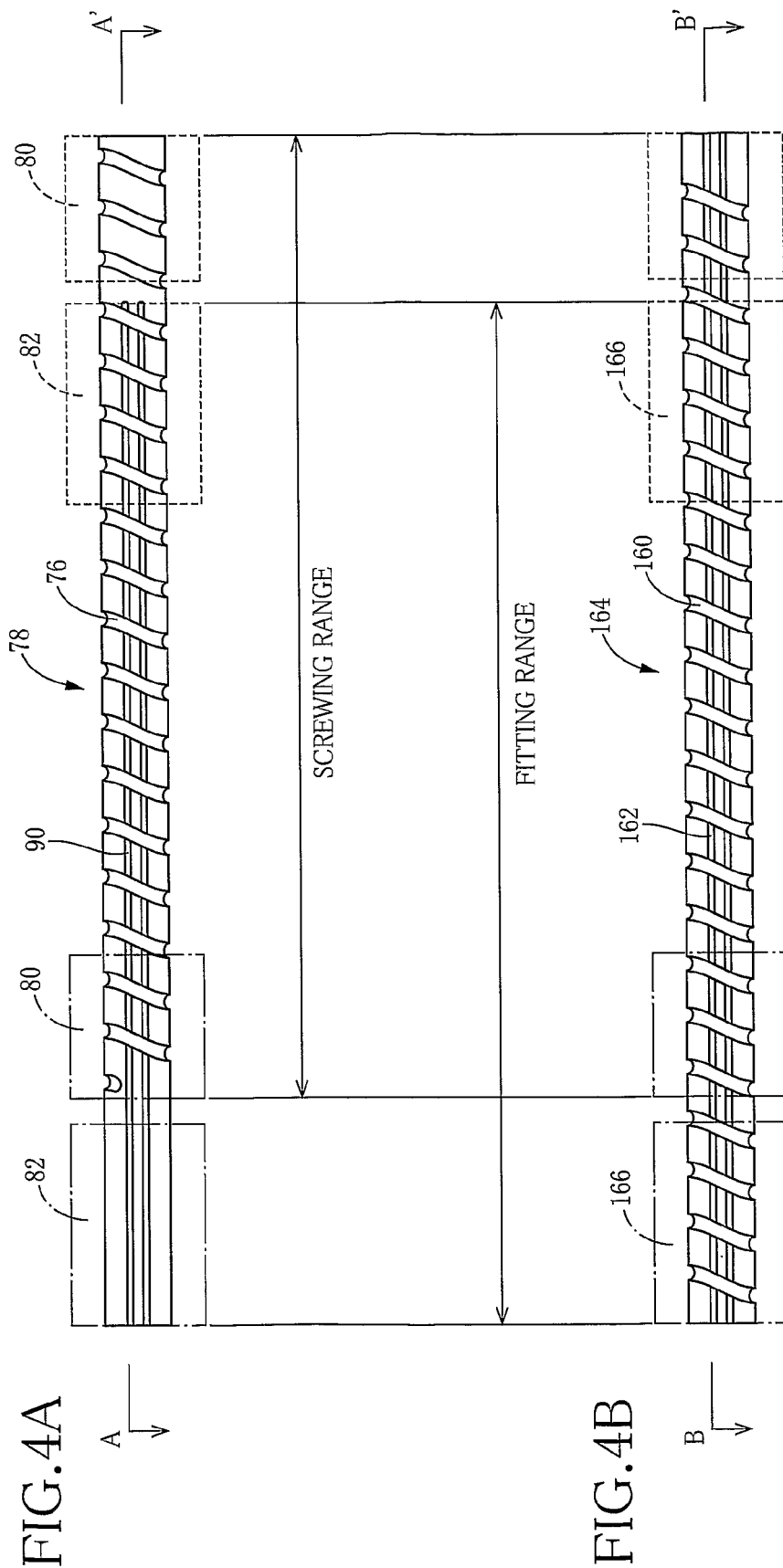
FIG. 4 is a view showing a threaded rod of the electromagnetic shock absorber of FIG. 1 and a threaded rod in which a threaded groove and spline grooves are formed over an entirety of its outer circumferential portion.
Figure 5:
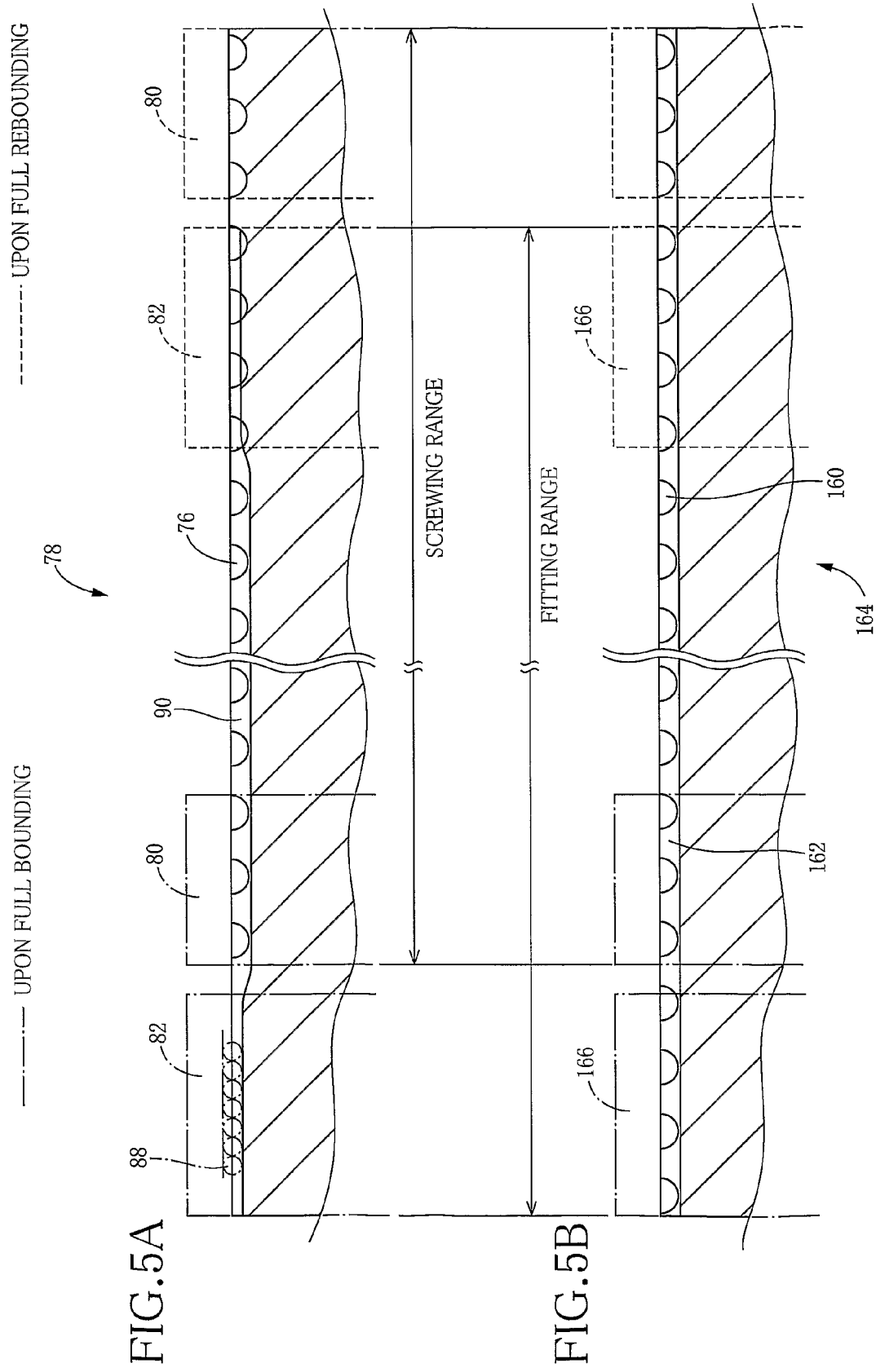
FIG. 5 is an enlarged cross sectional view showing the threaded rod of the electromagnetic shock absorber of FIG. 1 and the threaded rod in which the threaded groove and the spline grooves are formed over the entirety of its outer circumferential portion.

In the present absorber 10, the threaded groove 76 is helically formed only in the screwing range on the outer circumferential portion of the threaded rod 78, as shown in FIGS. 4A and 5A. The spline grooves 90 are formed only in the fitting range on the outer circumferential portion of the threaded rod 78 so as to extend in the axis direction. FIG. 5A is a cross sectional view of the threaded rod 78 taken along A-A' in FIG. 4A. In place of the threaded rod 78 in which the threaded groove 76 and the spline grooves 90 are formed in the respective specific ranges of the threaded rod 78, it is possible to employ a threaded rod 164 in which threaded groove 160 and the spline grooves 162 are formed over an entirety of the outer circumferential portion of the threaded rod 164, as shown in FIGS. 4B and 5B. FIG. 5B is a cross sectional view of the threaded rod 164 taken along B-B' in FIG. 4B. In FIGS. 4 and 5, the right side corresponds to the leading-end-portion side of the threaded rod, namely, the sprung-portion side, while the left side corresponds to the proximal-end-portion side of the threaded rod, namely, the unsprung-portion side.

Upon full bounding and upon full rebounding, there may be cases where the relative movement of the sprung-side unit and the unsprung-side unit is abruptly stopped and the relative rotation of the threaded rod 78 and the nut 80 is abruptly stopped. In such cases, a comparatively large rotational force may act on the threaded rod 78 due to the inertia of the nut 80, etc. This rotational force tends to be larger upon full bounding than upon full rebounding due to a thrusting shock from irregular road surfaces and the like. Even when the rotational force acts on the threaded rod 78, the threaded rod 78 is inhibiting from rotating about its axis owing to the abutting contact of the bearing balls 88 with the side walls of the spline grooves 90. In a strict sense, for one spline groove 90, the rotation of the threaded rod 78 in one direction is inhibited by the abutting contact of the bearing balls with one of the side walls while the rotation of the threaded rod 78 in the opposite direction is inhibited by the abutting contact of the bearing balls with the other of the side walls.

In the absorber that employs the threaded rod 164 in which the threaded groove and the spline grooves are formed over the entirety of the outer circumferential portion thereof, the threaded groove 160 intersect the spline grooves 162 over the entirety of the spline grooves 162 in the axis direction and therefore there exist portions in which the side walls of the spline grooves 162 are not present, as apparent from FIG. 5B. Hereinafter, those portions are referred to as "wall-less portions" where appropriate. Accordingly, where the rotation of the threaded rod 164 is inhibited by the spline nut 166 upon full bounding (indicated by the one-dot chain line in FIGS. 4 and 5) in which the rotational force acting on the threaded rod 164 is assumed to be relatively large, the bearing balls located at the wall-less portions of the spline grooves 162 are not held in contact with the side walls of the spline grooves 162, and only the bearing balls located at portions of the spline grooves 162 (wall-existing portions) other than the wall-less portions are held in contact with the side walls of the spline grooves 162. In the present absorber 10, on the other hand, at a section of the outer circumferential portion of the threaded rod 78 on which the spline nut 82 (indicated by the one-dot chain line) is fitted upon full bounding, the spline grooves 90 are formed whereas the threaded groove 76 is not formed, as shown in FIGS. 4A and 5B. That is, the threaded groove 76 is not formed at one end of the fitting range near to the proximal end portion of the threaded rod 78. In the present absorber 10, therefore, when the rotation of the threaded rod 78 is inhibited by the spline nut 82 upon full bounding, all of the bearing balls 88 in the spline grooves 90 can be held in contact with the side walls of the spline grooves 90 at the above-indicated one end of the fitting range where there exist no wall-less portions in the spline grooves 90. Further, in the specific range of the outer circumferential portion of the threaded rod 78, the threaded groove 76 is not formed, thereby reducing labor and cost for forming the threaded groove 76.

As apparent from FIGS. 4A and 5A, in the present absorber 10, the spline grooves 90 are not formed at a section of the outer circumferential portion of the threaded rod 78 on which the nut 80 (indicated by the dotted line) is fitted upon full rebounding. That is, the spline grooves 90 are not formed at one end of the screwing range near to the leading end portion of the threaded rod 78. In the present absorber 10, the spline grooves are not formed in the specific range of the outer circumferential portion of the threaded rod 78, thereby reducing labor and cost for forming the spline grooves 90.

The depth of each of the spline grooves 90 of the threaded rod 78 of the present absorber 10 is made smaller at opposite end portions of the fitting range than at an intermediate portion located between the opposite end portions, as shown in FIG. 5A. In other words, a clearance between each spline groove 90 and each bearing ball 88 that rolls in the spline groove 90 is made smaller at the opposite end portions of the fitting range than at the intermediate portion located therebetween. More specifically explained, the inner diameter of the passage of the bearing balls 88 that is defined by each spline groove 90 and the spline nut 82 is made slightly smaller than the outer diameter of each bearing ball 88, namely, the clearance between the bearing ball 88 and the spline groove 90 is set as a so-called minus or negative clearance. The above-indicated clearance at a portion of the fitting range other than the opposite end portions is set as a plus or positive clearance. Accordingly, there is generated a resistance force with respect to the relative movement of the threaded rod 78 and the spline nut 82, at the opposite end portions of the fitting range, namely, in the vicinity of the stroke ends of the absorber 10, so that the stroke speed of the absorber 10 is decreased. Therefore, it is possible to mitigate a shock to the absorber 10 upon full bounding and upon full rebounding. In FIG. 5, the shape of each of the threaded groove 76, 160 and spline grooves 90, 162 is exaggerated for easier understanding of the technical features of the present absorber 10.

2. Second Embodiment

Figure 6:
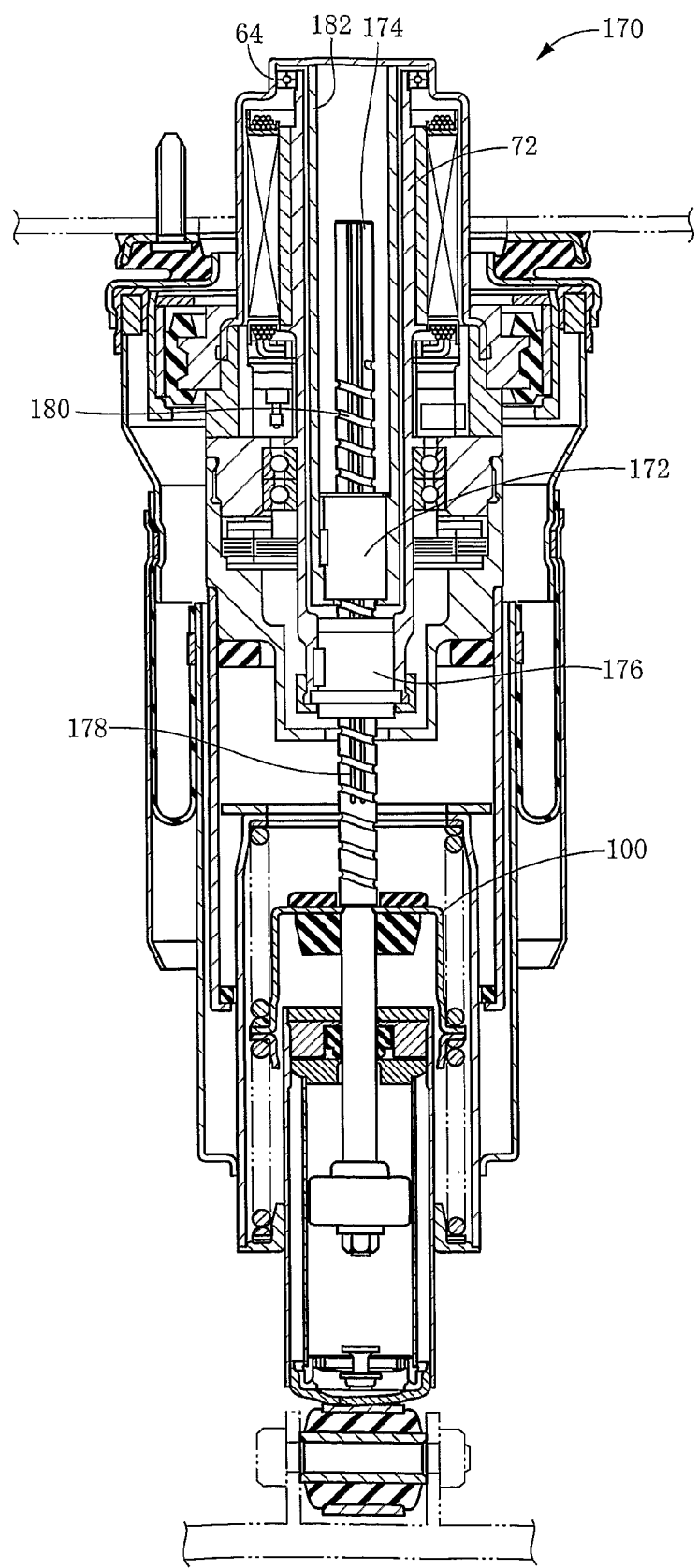
FIG. 6 is a cross sectional view of an electromagnetic shock absorber according to a second embodiment of the claimable invention.

FIG. 6 shows an electromagnetic shock absorber (hereinafter referred to as "absorber" where appropriate) 170 according to a second embodiment of the invention. The absorber 10 in the illustrated first embodiment is configured such that the spline nut 82 is fitted in the spline grooves 90 on one side of a portion of the threaded rod 78 where the nut 80 is screwed with the threaded rod 78, which one side is near to the proximal end portion of the threaded rod 78. In contrast, the absorber 170 in the second embodiment is configured such that a ball spline nut (hereinafter abbreviated as "spline nut" where appropriate) 172 is fitted in spline grooves 178 on one side of a portion of the threaded rod 174 where a nut 176 is screwed with the threaded rod 174, which one side is near to the leading end portion of the threaded rod 174. Except the above configuration, the absorber 170 in the second embodiment is substantially identical in construction with the absorber 10 in the illustrated first embodiment. Accordingly, the absorber 170 will be explained focusing on the ball screw mechanism and the ball spline mechanism, and an explanation of the same constituent elements as in the first embodiment will be omitted or made briefly by using the same reference numerals as used in the first embodiment.

The absorber 170 includes the threaded rod 174 whose outer circumferential portion is formed with a threaded groove 180 and the nut 176 which holds bearing balls and which is screwed with the threaded rod 174. The nut 176 is fixedly fitted to the lower end of the motor shaft 72 while screwed with the threaded rod 174. The threaded rod 174 is disposed on the rod support member 100 so as to extend upright therefrom while penetrating through the motor shaft 72. The absorber 170 is equipped with the spline nut 172 having a construction similar to that of the spline nut 82 in the illustrated first embodiment. The spline nut 172 as the rod-rotation inhibiting member is fitted on the threaded rod 174 on one side of the portion of the threaded rod 174 where the nut 176 is screwed with the threaded rod 174, which one side is near to the leading end portion of the threaded rod 174. More specifically explained, there is inserted, into the hollow motor shaft 72 from above the same 72, a cylindrical member 182 which is fixed at its upper end to the lower surface of the cap portion of the motor casing 64, and the leading end portion of the threaded rod 174 is inserted into the cylindrical member 182 from below the same 182. The spline nut 172 holding a plurality of bearing balls as the fitting portion is fixedly fitted to a lower end portion of the cylindrical member 182, with the threaded rod 174 penetrating through the spline nut 172. The threaded rod 174 has spline grooves 178 each as the axial groove formed on its outer circumferential portion such that the plurality of bearing balls can be fitted therein. In the present absorber 170, the threaded rod 174 is inhibited from rotating about its axis while permitted to move in the axis direction, by the thus constructed ball spline mechanism.

Figure 7:
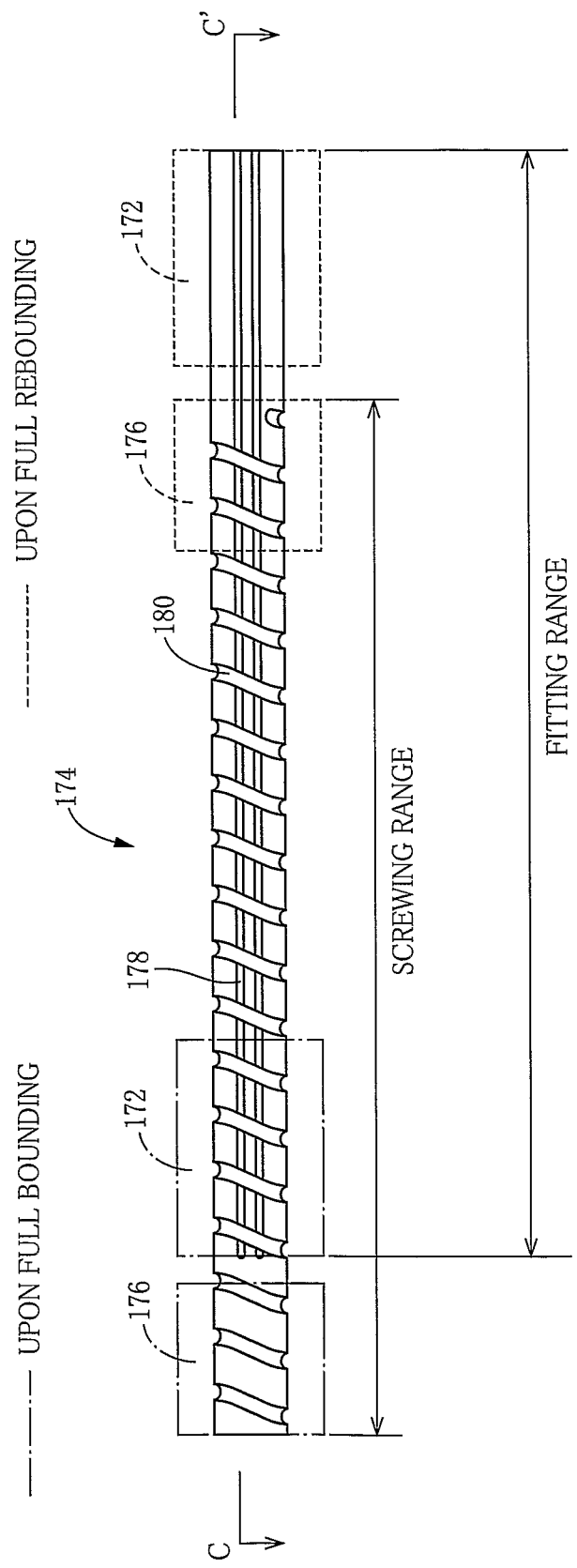
FIG. 7 is a view showing a threaded rod of the electromagnetic shock absorber of FIG. 6.
Figure 8:
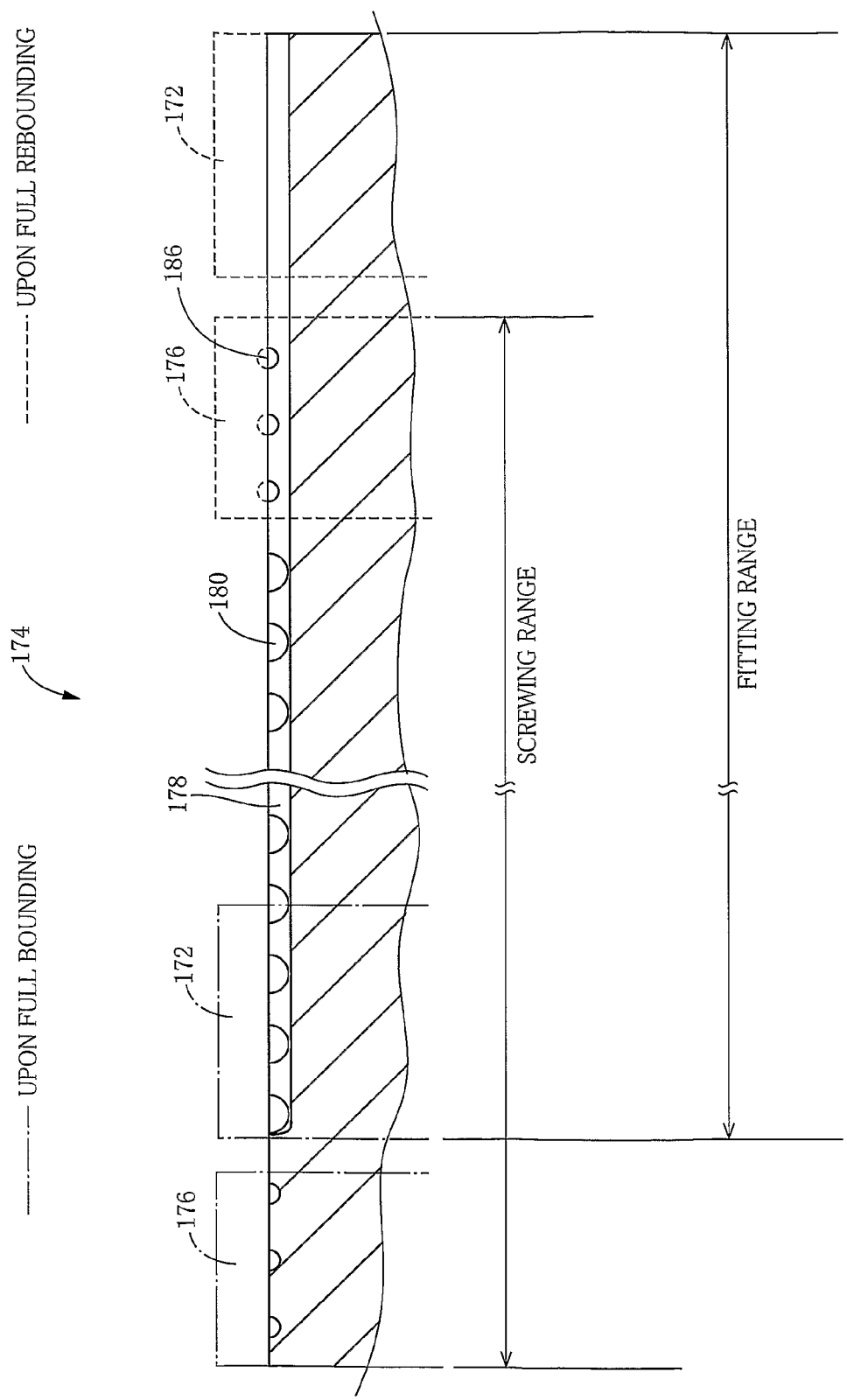
FIG. 8 is an enlarged cross sectional view showing the threaded rod of the electromagnetic shock absorber of FIG. 6.

Like the absorber 10 in the illustrated first embodiment, the present absorber 170 is equipped with the rebound stopper and the bound stopper. Accordingly, the screwing range and the fitting ranges are limited, as shown in FIGS. 7 and 8. The threaded groove 180 is helically formed only in the screwing range on the outer circumferential portion of the threaded rod 174 while the spline grooves 178 are formed only in the fitting range on the outer circumferential portion of the threaded rod 174 so as to extend in the axis direction. FIG. 8 is a cross sectional view of the threaded rod 174 taken along C-C' in FIG. 7. In FIGS. 7 and 8, the right side corresponds to the leading-end-portion side of the threaded rod, namely, the sprung-portion side, while the left side corresponds to the proximal-end-portion side of the threaded rod, namely, the unsprung-portion side.

In the present absorber 170, at a section of the outer circumferential portion of the threaded rod 174 on which the spline nut 172 (indicated by the dotted line) is fitted upon full rebounding, the spline grooves 178 are formed whereas the threaded groove 180 is not formed. That is, the threaded groove 180 is not formed at one end of the fitting range near to the leading end portion of the threaded rod 174. In the present absorber 170, therefore, when the rotation of the threaded rod 174 is inhibited by the spline nut 172 upon full rebounding, all of the bearing balls in the spline grooves 178 can be held in contact with the side walls of the spline grooves 180 at the above-indicated one end of the fitting range where there exist no wall-less portions in the spline grooves 180.

As in the absorber 10 in the first embodiment, the threaded groove 180 is not formed in the specific section of the fitting range, and the spline grooves 178 are not formed in the specific section of the screwing range. Therefore, it is possible in the present absorber 170 to reduce labor and cost for forming the threaded groove 180 and the spline grooves 178.

The size or dimension of the threaded groove 180 of the threaded rod 174 of the present absorber 170 is made smaller at opposite end portions of the screwing range than at an intermediate portion located between the opposite end portions, as shown in FIG. 8. In other words, a clearance between the threaded groove 180 and each of the bearing balls 186 that roll in the spline grooves 90 is made smaller at the opposite end portions of the screwing range than at the intermediate portion located therebetween. More specifically explained, the inner diameter of the passage of the bearing balls 186 that is defined by the threaded groove 180 and the nut 176 is made slightly smaller than the outer diameter of each bearing ball 186, namely, the clearance between the bearing ball 186 and the threaded groove 180 is set as a so-called minus or negative clearance. The above-indicated clearance at a portion of the screwing range other than the opposite end portions is set as a plus or positive clearance. Accordingly, there is generated a resistance force with respect to the relative movement of the threaded rod 174 and the nut 176, at the opposite end portions of the screwing range, namely, in the vicinity of the stroke ends of the absorber 170, so that the stroke speed of the absorber 170 is decreased. Therefore, it is possible to mitigate a shock to the absorber 170 upon full bounding and upon full rebounding. In FIG. 8, the shape of each of the threaded groove 180 and spline grooves 178 is exaggerated for easier understanding of the technical features of the present absorber 170.

The invention claimed is:

1. An electromagnetic shock absorber for a vehicle, comprising:
   a sprung-side unit which includes a housing tube and which is connected to a sprung portion at the housing tube;
   an unsprung-side unit which is connected to an unsprung portion and which is permitted to move relative to the sprung-side unit in association with a relative movement of the sprung portion and the unsprung portion;
   a screw mechanism including: (a) a threaded rod which is supported, at one end portion thereof, by the unsprung-side unit and which has a threaded groove formed in an outer circumferential portion of the threaded rod and an axial groove formed in the outer circumferential portion and extending in an axis direction of the threaded rod; and (b) a nut which is immovably and rotatably held by the sprung-side unit and which is screwed with the threaded rod, the screw mechanism being configured such that the nut rotates in association with a relative movement of the sprung-side unit and the unsprung-side unit;

a rod-rotation inhibiting member which includes a fitting portion configured to be fitted in the axial groove and which is immovably and unrotatably disposed on the sprung-side unit, at a position where the fitting portion is fitted in the axial groove on one of opposite sides of a portion of the threaded rod at which the nut is screwed therewith, the one of the opposite sides of a portion of the threaded rod at which the nut is screwed being near to one of the one end portion and the other end portion of the threaded rod, the rod-rotation inhibiting member being configured to inhibit the threaded rod from rotating relative to the sprung-side unit while permitting the threaded rod to move relative to the sprung-side unit in the axis direction;

an electromagnetic motor which gives a rotational force to the nut;

an elastic connecting member for elastically interconnecting the unsprung-side unit to the unsprung portion; and a damper which includes: a housing which is supported by the unsprung portion and which accommodates a working fluid in an inside thereof; a piston which divides the inside of the housing into two fluid chambers and which is movable in the housing; a piston rod having one end connected to the piston and the other end extending from the housing so as to be connected integrally to the one end portion of the threaded rod; and a flow-resistance giving mechanism which gives a resistance against a flow of the working fluid between the two fluid chambers in association with a movement of the piston, the damper being disposed in parallel with the elastic connecting member so as to generate a damping force with respect to a relative movement of the unsprung-side unit and the unsprung portion, wherein the rod-rotation inhibiting member is fixed to an inner circumferential surface of the housing tube and the electromagnetic motor is supported by the housing tube, wherein the electromagnetic shock absorber is configured to generate, based on the rotational force, a resistance force with respect to the relative movement of the sprung-side unit and the unsprung-side unit, wherein a range which extends in the axis direction on the outer circumferential portion of the threaded rod and within which the fitting portion is allowed to be fitted in the axial groove in association with the relative movement of the sprung-side unit and the unsprung-side unit between full bounding, in which the sprung portion and the unsprung portion are inhibited from moving toward each other beyond a prescribed distance therebetween, and full rebounding, in which the sprung portion and the unsprung portion are inhibited from moving away from each other beyond a prescribed distance therebetween, in an instance where the axial groove is present in the range is defined as a fitting range, wherein the electromagnetic shock absorber further comprises a first movement-inhibiting mechanism for inhibiting the relative movement of the sprung portion and the unsprung portion toward each other beyond the prescribed distance, and a second movement-inhibiting mechanism for inhibiting the relative movement of the sprung portion and the unsprung portion away from each other beyond the prescribed distance, and wherein the threaded groove is not formed in a section of the fitting range at which the fitting portion is fitted in the axial groove when the fitting portion is located at an end of the fitting range near to the one of the one end portion and the other end portion of the threaded rod upon one of full bounding and full rebounding.

2. The electromagnetic shock absorber according to claim 1, wherein the threaded groove is not formed in the section of the fitting range at which the fitting portion is fitted in the axial groove when the fitting portion is located at the end of the fitting range near to the one of the one end portion and the other end portion of the threaded rod upon full bounding.

3. The electromagnetic shock absorber according to claim 2, wherein the threaded groove is not formed in the section of the fitting range at which the fitting portion is fitted in the axial groove when the fitting portion is located at the end of the fitting range near to the one end portion of the threaded rod upon full bounding.

4. The electromagnetic shock absorber according to claim 1, wherein a range which extends in the axis direction on the outer circumferential portion of the threaded rod and within which the nut is allowed to be screwed with the threaded groove in association with the relative movement of the sprung-side unit and the unsprung-side unit between full bounding and full rebounding in an instance where the threaded groove is present in the range is defined as a screwing range, and wherein the threaded groove is formed only in the screwing range.

5. The electromagnetic shock absorber according to claim 1, wherein a range which extends in the axis direction on the outer circumferential portion of the threaded rod and within which the nut is allowed to be screwed with the threaded groove in association with the relative movement of the sprung-side unit and the unsprung-side unit between full bounding and full rebounding in an instance where the threaded groove is present in the range is defined as a screwing range, and wherein the axial groove is not formed in a section of the screwing range at which the nut is screwed with the threaded groove when the nut is located at an end of the screwing range near to the other of the one end portion and the other end portion of the threaded rod upon the other of full bounding and full rebounding.

6. The electromagnetic shock absorber according to claim 5, wherein the axial groove is formed only in the fitting range.

7. The electromagnetic shock absorber according to claim 5, wherein the axial groove is not formed in the section of the screwing range at which the nut is screwed with the threaded groove when the nut is located at the end of the screwing range near to the other of the one end portion and the other end portion of the threaded rod upon full rebounding.

8. The electromagnetic shock absorber according to claim 7, wherein the axial groove is not formed in the section of the screwing range at which the nut is screwed with the threaded groove when the nut is located at the end of the screwing range near to the other end portion of the threaded rod upon full rebounding.

9. The electromagnetic shock absorber according to claim 1, wherein a clearance between the axial groove and the fitting portion is made smaller at opposite end portions of the fitting range than an intermediate portion between the opposite end portions.

10. The electromagnetic shock absorber according to claim 1,
wherein a range which extends in the axis direction on the outer circumferential portion of the threaded rod and within which the nut is allowed to be screwed with the threaded groove in association with the relative movement of the sprung-side unit and the unsprung-side unit between full bounding and full rebounding in an instance where the threaded groove is present in the range is defined as a screwing range, and
wherein a clearance between the threaded groove and the nut is made smaller at opposite end portions of the screwing range than an intermediate portion between the opposite end portions.

11. The electromagnetic shock absorber according to claim 1, wherein the nut holds a plurality of bearing balls that roll in the threaded groove, and the screw mechanism is a ball screw mechanism.

12. The electromagnetic shock absorber according to claim 1, wherein the electromagnetic motor includes a hollow cylindrical motor shaft for holding the nut at one end thereof and is disposed on the sprung-side unit with the threaded rod penetrating through the motor shaft.

13. The electromagnetic shock absorber according to claim 1,
wherein the rod-rotation inhibiting member is a ball spline nut which holds a plurality of bearing balls that roll in the axial groove and through which the threaded rod penetrates, and
wherein the fitting portion is constituted by the plurality of bearing balls.

14. The electromagnetic shock absorber according to claim 1,
wherein the rod-rotation inhibiting member is disposed at the position where the fitting portion is fitted in the axial groove on one side of the portion of the threaded rod at which the nut is screwed therewith, which one side is near to the one end portion of the threaded rod.

15. The electromagnetic shock absorber according to claim 1, wherein the first movement-inhibiting mechanism includes a lower surface of the housing tube of the sprung-side unit and a cushion rubber provided on an upper surface of the unsprung-side unit.

16. The electromagnetic shock absorber according to claim 1, wherein the second movement-inhibiting mechanism includes an annular member disposed at an upper end of a damper cover which elastically supports the unsprung-side unit and covers the damper, and a cushion rubber disposed on a flange portion of a cover tube fixed to an outer circumferential surface of a lower surface of housing tube of the sprung-side unit, the damper cover being inserted into the cover tube.

* * * * *